Figure 1:
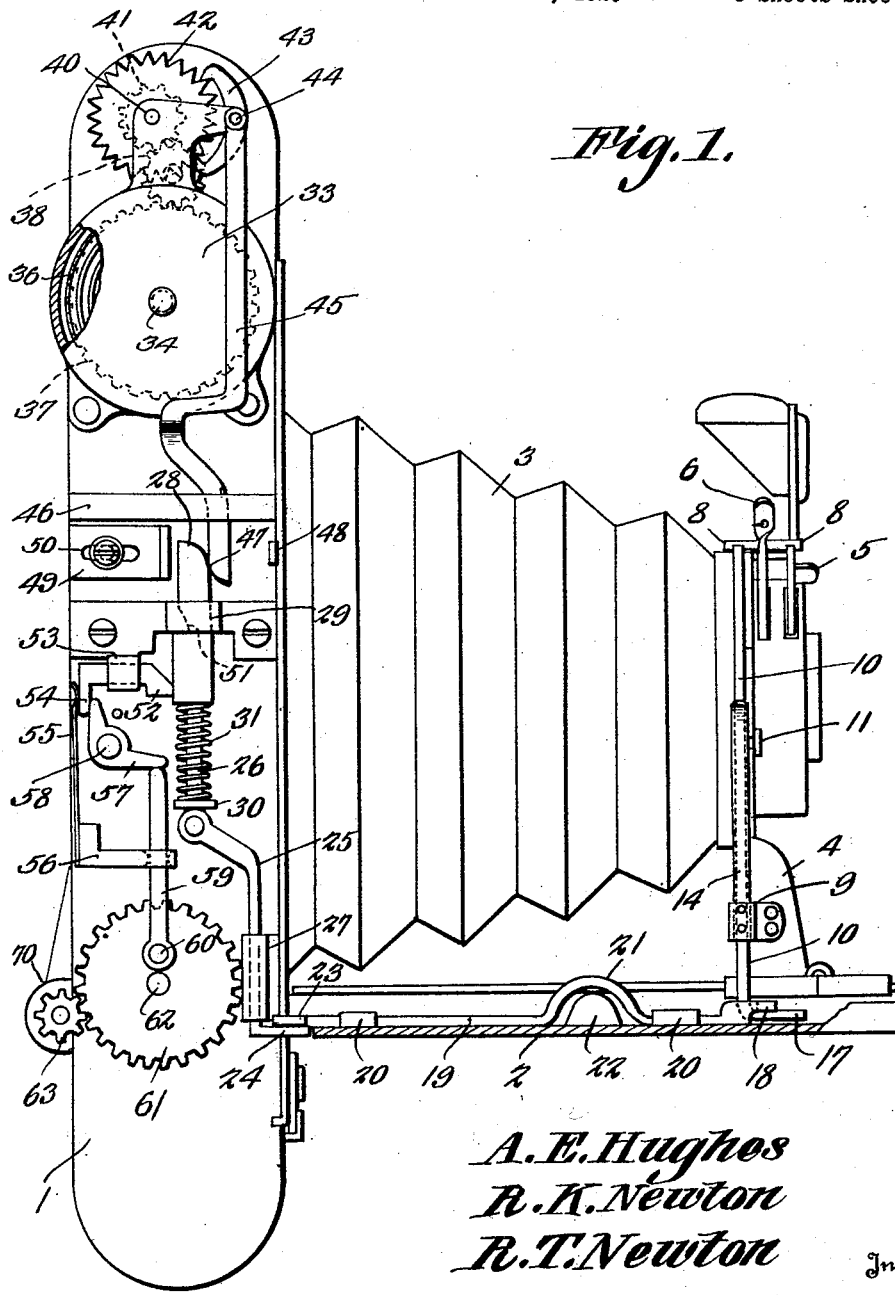

May 26, 1925. 1,539,489
A. E. HUGHES ET AL
CAMERA ATTACHMENT
Filed Oct. 2, 1923 3 Sheets-Sheet 1

A.E.Hughes
R.K.Newton
R.T.Newton
Inventors

By C.A.Snow & Co.
Attorneys

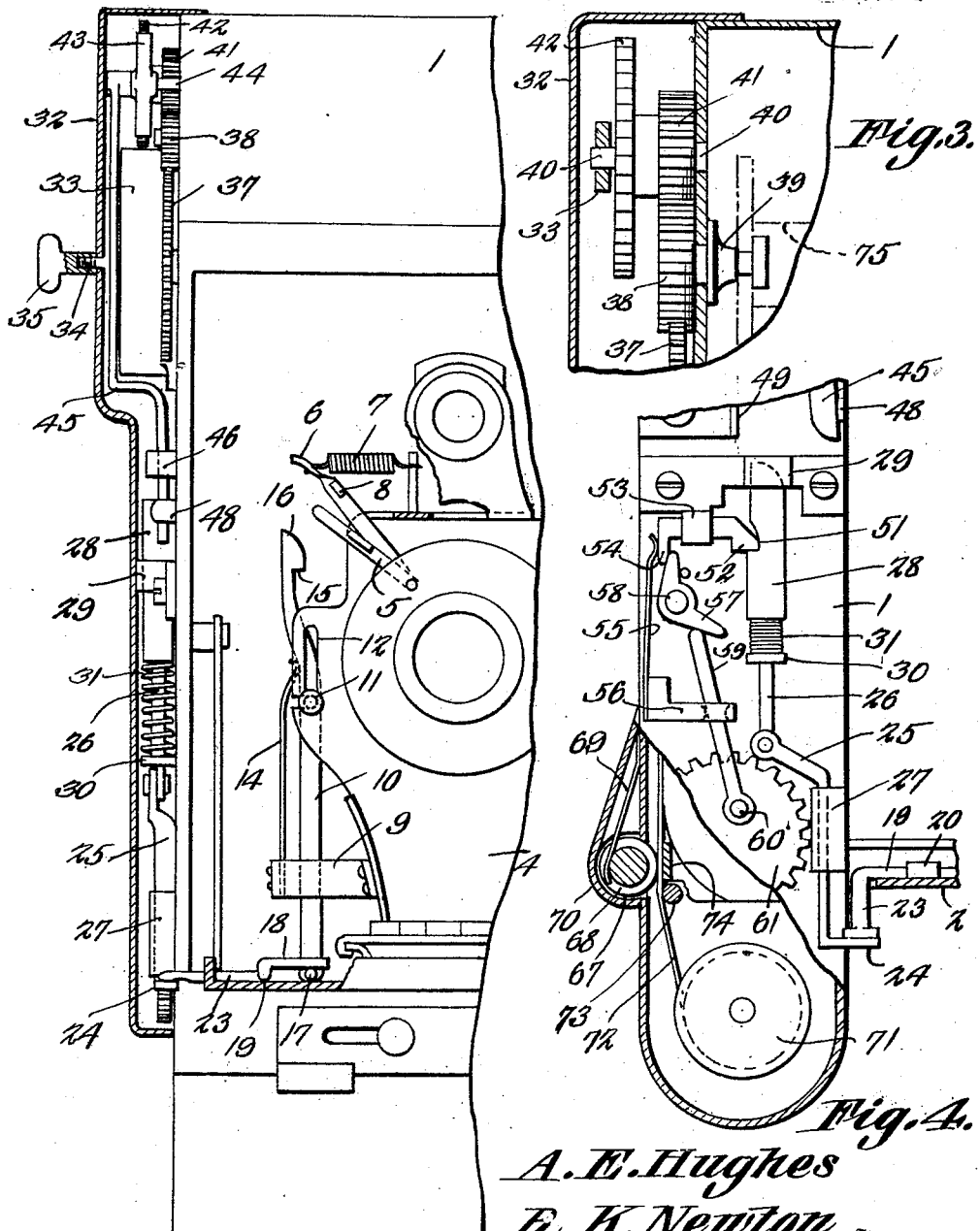

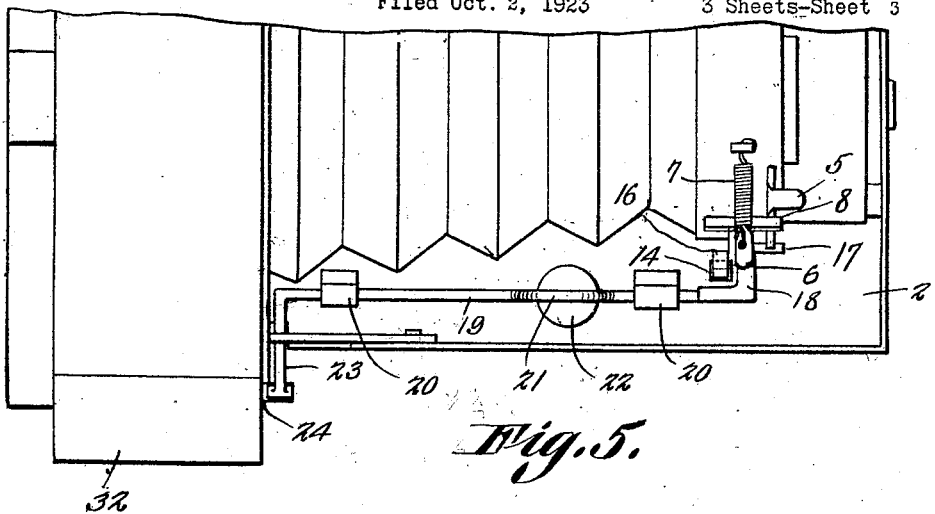
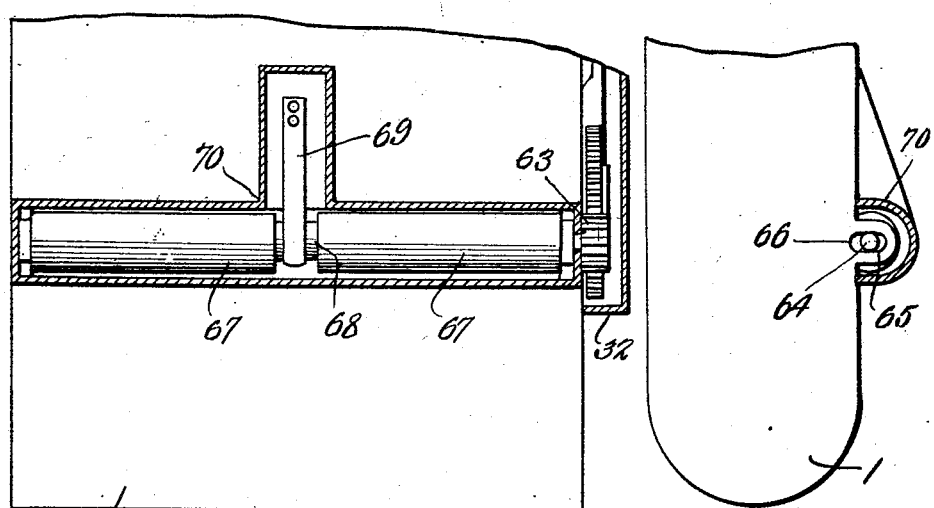
A. E. Hughes
R. K. Newton
R. T. Newton
Inventors

Patented May 26, 1925.

1,539,489

UNITED STATES PATENT OFFICE.

AUSKER E. HUGHES, RALPH K. NEWTON, AND RUFUS T. NEWTON, OF GRAHAM, VIRGINIA.

CAMERA ATTACHMENT.

Application filed October 2, 1923. Serial No. 666,166.

*To all whom it may concern:*

Be it known that we, AUSKER E. HUGHES, RALPH K. NEWTON, and RUFUS T. NEWTON, citizens of the United States, residing at Graham, in the county of Tazewell and State of Virginia, have invented a new and useful Camera Attachment, of which the following is a specification.

The device forming the subject matter of this application is an attachment for a camera, and this invention aims to provide novel means whereby, after an exposure has been made, a predetermined amount of film will be wound away automatically, and a new portion of the film being moved into the field of the lens of the camera.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown, can be made, without departing from the spirit of the invention.

In the accompanying drawings:—

Figure 1 shows in side elevation, a camera equipped with the device forming the subject matter of this application, parts being broken away; Figure 2 is a front elevation wherein parts are broken away; Figure 3 is a section taken through a portion of the winding mechanism; Figure 4 is a view similar to Figure 1, but showing parts in a different position from that depicted in Figure 1; Figure 5 is a top plan wherein parts are broken away; Figure 6 is a rear elevation, parts appearing in section; Figure 7 is a side elevation wherein parts are broken away.

The numeral 1 marks the casing of a camera, the numeral 2 designating the usual hinged table, adapted to be swung downwardly to a horizontal position, as shown in Figure 1. The bellows appear at 3 and is connected to a top member 4, slidable on the table, 2—all as usual. The shutter lever is marked by the numeral 5.

In carrying out the invention, an operating lever 6 is mounted to swing on the front member 4, in a plane parallel to the shutter lever 5. A spring 7, connected to the operating lever 6 and to the front member 4, tends to swing the operating lever 6 to the right in Figure 2. The operating lever 6 carries a cross piece 8 adapted to cooperate with the shutter lever 5.

A guide 9 is mounted on the front member 4. A plunger 10 is mounted for longitudinal reciprocation for a slight swinging movement in the guide 9, the plunger having a projection 11 movable in an L-shaped slot 12 fashioned in the front member 4. A spring 14 is secured to the guide 9 and bears against the plunger 10, to swing the plunger 10 to the right in Figure 2. Adjacent to its upper end, the plunger 10 has a shoulder 15, above which is located a beveled edge 16. At its lower end, the plunger 10 is supplied with a finger 17 engaged with an arm 18 on a rock shaft 19 journaled in bearings 20 on the table 2, the shaft being offset as at 21 clear the tripod lug 22 on the table 2. At its inner end, the rock shaft 19 is provided with a crank arm 23 located above a projection 24 on the offset foot 25 of a plunger 26, the foot 25 being mounted to slide in a guide 27 on the casing 1. At its upper end, the plunger 26 has a head 28 slidable in a guide 29 on the casing 1. The plunger 26 slides in an abutment 30 on the casing 1. A compression spring 31 surrounds a portion of the plunger 26, one end of the spring engaging the abutment 30, and the other end of the spring engaging the head 28 of the plunger. The function of the spring 31 is to elevate the plunger 26 into the position shown in Figure 1. The plunger 26 and parts hereinbefore and hereinafter described are located within a housing 32 connected to the main casing 1 of the camera.

A supplemental casing 33 is mounted on the casing 1. A winding shaft 34 is journaled in the casing 33 and is adapted to be actuated by a removable key 35 to put tension in a spring 36 connected to a driving gear 37 journaled on the casing 1, the driving gear 37 meshing with a driven pinion 38 on a stub shaft 39 in the casing 1, the shaft 39 carrying one of the spools or reels 75 for the film.

A shaft 40 is journaled in the casing 1 and in a part of the casing 33. The shaft 40 carries a gear wheel 41, meshing with the driven pinion 38. A combined escape and stop wheel 42 is secured to the shaft 40. The escape wheel 42 cooperates with a pallet 43 on a shaft 44 carrying a combined escape and stop lever 45. In substance, the parts 45 and 43 constitute an escape member fulcrumed intermediate its ends, by means of the shaft 44, on the framework of the camera.

The escape and stop lever 45 has sliding movement beneath a bracket 46. A lower end of the escape lever 45 extends into the path of the head 28 of the plunger 26, the parts 28 and 45 being rounded for engagement with each other, as indicated by the numeral 47. The lever 45 oscillates between a fixed stop 48 on the casing 1, and a stop 49, adjustably secured at 50 to the casing for movement towards and away from the stop 48.

A keeper 51 is formed in the head 28 of the plunger 26 and is adapted to cooperate with a latch 52 slidably in a holder 53 on the casing 1, the latch having a depending finger 54, against which bears a leaf spring 55, serving to advance the latch, the lower end of the spring 55 being secured to a guide 56 on the casing 1. A bell crank lever 57 is fulcrumed at 58 on the casing 1, the upper end of the bell crank lever cooperating with the depending projection 54 on the latch 52. A pitman 59 is adapted to cooperate with the lower end of the bell crank lever 57 and is mounted for swinging and for longitudinal movement in the guide 56. The pitman 59 is pivoted at 60 to a gear wheel 61, journaled at 62 on the casing of the gear wheel 61 meshing with a pinion 63 on a shaft 64 journaled in elongated slots 65 formed in bearings 66 on the casing 1, the shaft being provided with a roller 67 having a circumferential groove 68 wherein is received a spring tongue 69 secured to the casing 1, the tongue 69 and the roller 67 being located within an offset covering 70 on the casing 1. The reel which carries one end of the film 72 is designated by the numeral 71, the film traversing a guide 73 in the casing 1, the spring tongue 69 serving to press the roller 67 against the film 72, as the film traverses a fixed portion 74 of the camera, as delineated in Figure 4 of the drawings.

In practical operation, the lever 6 is swung downwardly, and the cross piece 8 on the lever, cooperating with the shutter lever 5, causes the shutter to make the desired exposure. When the operating lever 6 swings downwardly, the cross piece 8 on the operating lever moves along the beveled edge 16 of the plunger 10 and engages the shoulder 15 on the plunger. Then the lever 6 swings upwardly responsive to the action of the spring 7, the plunger 10 is elevated, the cross piece 8 of the operating lever ultimately sliding from the shoulder 15, and permitting the plunger 10 to move downwardly under the action of the spring 31, the action of the spring being more clearly manifested as the description of the operation of the device proceeds.

Reverting to the upward movement of the plunger 10, under the action of the lever 6, the finger 17 on the lower end of the plunger 10, cooperating with the arm 18 on the shaft 19, rocks the shaft. When the shaft 19 is rocked, the crank arm 23 on the shaft, coacting with the projection 24 on the foot 25 of the plunger 26, draws the plunger 26, downwardly, the spring 31 being compressed. When the plunger 26 is drawn downwardly, the head 28 of the plunger is moved out of the path of the lower end of the lever 45, and the lever 45, together with the pallet 43, are set free for swinging movement. The lever 45 and the pallet 43 swing, responsive to the action of escape wheel 42, rotation being imparted to the escape wheel on the spring 36, by way of the driving gear 37, the driven pinion 38, the gear wheel 41 and the shaft 40. When the shaft 39 is rotated through the instrumentality of the pinion 38, the film will be reeled on the spool 75. The film 72, moving in contact with the roller 67 on the shaft 64, rotates the shaft 64, the shaft 64 transmitting rotation to the gear wheel 61 by way of the pinion 63. The gear wheel 61 draws the pitman 59 downwardly in the guide 56 out of the path of the bell crank lever 57 and the bell crank lever 57 swings on its fulcrum 58, thereby setting free the latch 52, the latch 52 advancing under the action of the spring 55 until the latch 52 is engaged into the keeper 51 on the head 28 of the plunger 26, thereby holding the head 28 of the plunger depressed and out of the way of the lower end of the lever 45. The lever 45 continues to swing, and the shaft 39 and the spool 75 continue to rotate under the impulse of the spring 36, until the exposed portion of the film has been wound out of the way. By this time the gear wheel 61 has been carried into position shown in Figure 1 and the pitman 59 has tilted the bell crank lever 57 on its fulcrum 58 until the latch 52 has been retracted out of the keeper 51 in the head 28 of the plunger 26, the plunger 26 rising under the action of the spring 31 until the head 28 of the plunger again is engaged with the lower end of the lever 45, whereupon the rotation of the shaft 39 and the winding of the film on the spool 75, due to the action of the spring 36, is ended.

In the event that the operator wishes to make a time exposure, the shutter is opened by a downward movement of the shutter lever 5, and after the desired period of time has elapsed, the shutter lever is moved downwardly to close the shutter, in the way hereinbefore described, that is, the lever 6 is swung downwardly, the cross piece 8 on the lever 6 swinging the shutter lever 5 downwardly, to close the shutter.

Having thus described the invention, what is claimed is:—

1. In a camera, a winding shaft, spring means for operating the winding shaft, an escapement controlling the rotation of the winding shaft responsive to the spring means, a plunger for co-operating with the escapement to hold the winding shaft against rotation, means under the control of an operator, for moving the plunger out of engagement with the escapement, spring means for moving the plunger into engagement with the escapement, a latch cooperating with the plunger to hold the plunger out of engagement with the escapement, a lever coacting with the latch to withdraw the latch, spring means for advancing the latch, a rotary member driven by the film proceeding to the winding shaft, and a pitman operated by the rotary member and constituting means for operating the lever to withdraw the latch.

2. In a camera, a winding shaft, spring means for operating the winding shaft, mechanism controlling the rotation of the winding shaft responsive to the spring means, a plunger cooperating with the said mechanism to hold the winding shaft against rotation, means under the control of an operator for moving the plunger out of engagement with said mechanism, spring means for moving the plunger into engagement with said mechanism, a latch cooperating with the plunger to hold the plunger out of engagement with said mechanism, a lever coacting with the latch to withdraw the latch, spring means for advancing the latch, a rotary member driven by the film proceeding to the winding shaft, and means operated by the rotary member to tilt the lever and withdraw the latch.

3. In a camera, a winding shaft, spring means for operating the winding shaft, mechanism controlling the rotation of the winding shaft responsive to the spring means, a movable member cooperating with said mechanism to hold the winding shaft against rotation, means under the control of an operator for moving said member out of engagement with said mechanism, a latch cooperating with said member to hold the same out of engagement with said mechanism, a lever coacting with the latch to withdraw the latch, a rotary member driven by the film proceeding to the winding shaft, and means operated by the rotary member for withdrawing the latch.

4. In a camera, a winding shaft, spring means for operating the winding shaft, mechanism controlling the rotation of the winding shaft responsive to the spring means, a movable member cooperating with the said mechanism to hold the winding shaft against rotation, a rock shaft journaled on the camera, means for operating the winding shaft, means for connecting the rock shaft with said member for moving said member out of engagement with said mechanism, latch coacting with said member to hold said member out of engagement with said mechanism, and means responsive to the movement of the film proceeding to the winding shaft, or withdrawing the latch from engagement with said member.

In testimony that we claim the foregoing as our own, we have hereto affixed our signatures.

AUSKER E. HUGHES.
RALPH K. NEWTON.
RUFUS T. NEWTON.